United States Patent [19]
Ljung et al.

[11] 3,992,953
[45] Nov. 23, 1976

[54] ACCELEROMETER USING RADIOACTIVE PICKOFF

[75] Inventors: Bo H. Ljung, Wayne; Bernard Friedland, West Orange, both of N.J.

[73] Assignee: The Singer Company, Little Falls, N.J.

[22] Filed: Dec. 24, 1974

[21] Appl. No.: 536,141

[52] U.S. Cl............................................. 73/517 B
[51] Int. Cl.². ......................................... G01P 15/08
[58] Field of Search............ 73/517 B, 517 M, 517 R

[56] References Cited
UNITED STATES PATENTS

| | | | |
|---|---|---|---|
| 3,120,130 | 2/1964 | Cohen................................ | 73/517 B |
| 3,858,451 | 1/1975 | Stiles................................. | 73/517 B |

Primary Examiner—Richard E. Aegerter
Assistant Examiner—Frederick R. Schmidt
Attorney, Agent, or Firm—T. W. Kennedy

[57] ABSTRACT

A precision accelerometer is provided which is capable of measuring linear accelerations along three axes. The accelerometer incorporates a self-charging radioactive particle as the inertial acceleration sensing mass. The particle is contained in an evacuated cubical chamber, and the position of the particle within the chamber is established by the differential between the mean number of emitted charged particles detected at the opposite walls of the chamber, whenever the particle moves from a central position within the chamber. The accelerometer includes an electronic control system which generates feedback signals that tend to maintain the particle centered within the chamber in the presence of accelerations, and at the same time to provide electrical outputs which are measurements of the accelerations along the three coordinate axes.

6 Claims, 3 Drawing Figures

COUNT, c

TIME

FIG. 3   Typical Count Profile

ACCELEROMETER USING RADIOACTIVE PICKOFF

BACKGROUND OF THE INVENTION

Many attempts have been made in the prior art to construct precision accelerometers for use in guidance and navigation systems, and which have the capability of accurately measuring accelerations of the vehicle along the three coordinate axes. The most common prior art accelerometer is the spring-suspended mass type. However, such prior art instruments are usually capable of measuring accelerations only along one or two axes. Therefore, two or more of such prior art spring-suspended accelerometers are required in order to measure accelerations along the three coordinate axes. Moreover, instability and hysteresis of the springs limit the accuracy of this type of accelerometer.

Accelerometers have been suggested in the prior art which are capable of measuring accelerations along the three coordinate axes, and which do not involve the need and constraints of mechanical springs. One such instrument is described, for example, in Browning U.S. Pat. No. 3,148,456. An accelerometer is described in the Browning patent which is capable of measuring accelerations along any of the three coordinate axes. This is achieved by measuring variations in the intensity of nuclear radiation from a radioactive spherical inertial sensing mass which is positioned within the spherical chamber. The positioning of the sensing mass within the chamber is accomplished by virtue of the static and dynamic electrostatic fields produced and maintained within the chamber by the emission and subsequent absorption of alpha and beta nuclear particles from the inertial sensing mass, the nuclear particles having their origin in radioactive sources contained within the mass.

As described in the Browning patent, by utilizing radioactive source materials located in the central inertial sensing mass, it is possible to position the central mass centrally within the spherical chamber in a condition of stable equilibrium, this being achieved by virtue of the emission and subsequent absorption of the electrically charged alpha and beta particles from the central mass within the spherical chamber, and without the need for external circuitry or external power sources to supply the required energy. The symmetrical electrostatic field normally developed within the spherical chamber in the Browning system no longer retains its symmetry when the inertial sensing mass is displaced by some acceleration, and the charged particle emission from the mass then causes a restoring force to be developed which is equal in magnitude but opposite in direction to the displacing force, so that a condition of stable equilibrium exists for the displaced mass relative to the center of the spherical chamber so long as the acceleration continues.

The accelerometer of the present invention is of the same general type as the accelerometer described in the Browning patent, in that it also includes a radioactive source positioned within an enclosed chamber. However, the accelerometer of the present invention uses a radioactive particle, instead of utilizing a sphere of substantial dimensions, as the inertial sensing mass. Also, the accelerometer of the present invention uses a cubical chamber, rather than a spherical chamber. An important feature of the accelerometer of the present invention is the provision of a feedback force which tends to return the particle to its central position in the presence of accelerations, and which, in itself, serves as a measure of the accelerations along the various coordinate axes.

The inertial sensing mass in the Browning accelerometer, as mentioned above, is formed by an inner sphere prepared with radio-nuclides which generate both alpha and beta emissions, and which is positioned in an evacuated chamber formed by a larger outer spherical casing. The outer spherical casing of the Browning accelerometer passes the beta-emitting radio-nuclides and yields three or more beta particles for each alpha particle. The inner sphere, constituting the inertial sensing mass, becomes electrostatically positively charged to a high potential during the operation of the Browning accelerometer, this potential being limited only by the leakage and recombination phenomena in the partial vacuum which is established within the spherical casing. The magnitude of the positive potential on the inner sphere is also affected by the rate of alpha and beta emissions, and is thus influenced by the depletion of the radio-nuclides with time.

The electrostatic charge on the inner sphere of the Browning accelerometer is the equivalent of the spring in the prior art spring-suspended mass accelerometers, and when the Browning instrument is subjected to an acceleration, the inner sphere will be displaced from its central position, as explained above, and the alpha and beta emissions will be re-distributed and consequently a restoring force is developed. However, the acceleration cannot be measured accurately because the Browning instrument does not incorporate a force feedback system, and the accuracy with which the acceleration can be measured is dependent, inter alia, upon the precision of the pickoff. Also, as mentioned above, the potential of the central sphere in the Browning instrument, and thus the scale factor of the instrument varies with time as the radio-nuclides are depleted, and constant recalibrations are required.

Accelerometers using radioactive inertial sensing masses, and employing force feedback systems, are known to the prior art. For example, such an accelerometer is described in Cohen U.S. Pat. No. 3,120,130. However, the instrument described in the Cohen patent is a single-axis accelerometer which uses a spring-restrained inertial sensing mass and a magnetic force-feedback system. Therefore, the Cohen instrument is limited in that it is a single axis device, and in that it requires a mechanical spring system to restrain the inertial sensing mass, so that its accuracy is limited by the instability and hysteresis of the spring. Also, the alpha-emitting nuclide used in the Cohen device has a finite life, so that the Cohen instrument, like the Browning instrument, has a scale factor which changes with time.

As mentioned above, the instrument of the present invention is similar to the Browning instrument in some respects in that it uses a radioactive inertial sensing mass centrally positioned within an outer casing, and normally held in that position by virtue of static and dynamic electrostatic fields produced and maintained within the chamber by the emission and subsequent absorption of nuclear particles from the mass.

In the instrument of the present invention, a self-charging radioactive particle is used as the inertial sensing mass, and the particle is suspended within an evacuated cubical chamber. The particle may emit, for example, alpha-particles, beta-particles, gamma-particles, or positrons. The particle is very small, and it carries only a very limited amount of the radioactive material, the amount being insufficient properly to position the mass within the casing at deflected positions in the presence of accelerations. Instead, the system of the present invention uses an external electronic feedback circuit to provide feedback forces to the chamber, which tend to return the particle to its central position in the presence of accelerations, and the circuit also provides output signals which are a measure of the force required to return the particle to its central position, these forces being directly proportional to the accelerations being measured. The invention provides, therefore, a precise and accurate accelerometer, which is not subject to any of the limitations of the prior art accelerometers, as described above, even though a small and relatively weak radioactive particle is used. In the unit of the invention, and unlike the prior art instruments, the field emission from the radioactive particle is used to stabilize its potential, so that the potential of the particle remains constant, and the instrument is capable of precise and accurate operation over long time intervals without recalibration. The electrostatic field surrounding the particle should be homogeneous. Distortions in the field may be minimized to be as small as two parts per million by making the chamber size of the order of 1 inch and the particle diameter of the order of 0.001 – 0.002 inches. In this way the ratio between the geometrical imperfections of the spherical particle and the internal dimensions of the chamber can be reduced to be a few parts per million.

BRIEF DESCRIPTION OF THE DRAWINGS

FIG. 3 is a diagram of a random staircase function, useful in explaining the operation of the invention.

DETAILED DESCRIPTION OF THE ILLUSTRATED EMBODIMENT

Figure 1:
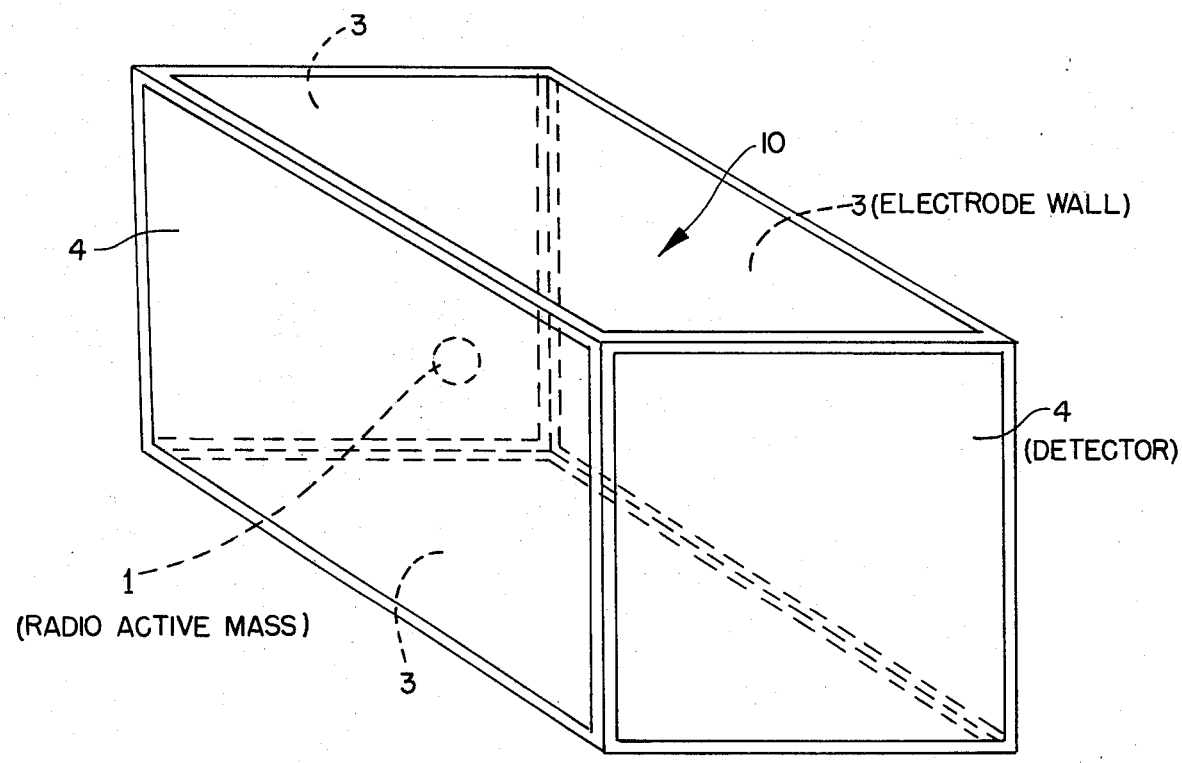
FIG. 1 is a schematic representation of a cubical accelerometer cell which contains a centrally positioned radioactive particle, and which constitutes a component of the accelerometer of the invention.
Figure 1:
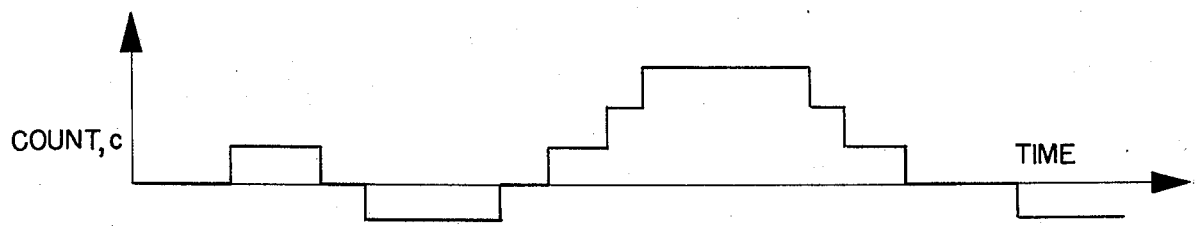

A cubical cell is designated generally as 10 in FIG. 1, and it forms a cubical chamber which contains a radioactive mass in the form of a particle 1. It is intended that the cell 10 be mounted in the aircraft, space vehicle, or the like, wich such an orientation, that the accelerometer of the invention will measure, for example, accelerations along the roll, yaw and pitch axes of the vehicle.

The cubical cell 10 has three pairs of facing walls, each being designated 3, and each formed of appropriate material so as to form an electrode; and a radiation detector 4 is mounted on each of the walls. The radiation detectors 4, for example, may be any suitable type of radiation detector which is capable of responding to the emission from the particle, and of producing electric output pulses in response thereto. The known silicon junction radiation detector is particularly suitable for this purpose. The particle 1 includes an appropriate source of alpha-emitting, beta-emitting, or gamma-emitting radio-nuclides, or source of positrons, and it is normally held in a central position within the cubical chamber because of the electrostatic fields established by the control system, as explained above. The collisions of the emitted particles with each wall 3 are detected by the corresponding detector 4.

The cubical cell of FIG. 1 represents a three-axes precision accelerometer which uses a small radioactive mass 1 enclosed in a cubical volume, with detectors 4 being provided on each wall 3 of the chamber. The position of the particle 1 within the cubical chamber can be detected by the radioactive detectors 4, and a force feedback system can then be employed to return the particle to its central position in the presence of accelerations, and accurately to measure the accelerations along the three coordinate axes.

The interior of the cubical chamber of the cell 10 is evacuated, or almost evacuated, so that the potential of the particle 1 is dependent only on the field emission from the particle. The field emission, in turn, is dependent only upon the radius of the particle, and on its material. Since both these parameters are constant, the potential of the particle will remain constant, and it will not deplete with time. The potential of the particle is also independent of pressure variations within the chamber, and within certain limits is independent of the natural depletion of the radio-nuclides within the particle. Therefore, the instrument may undergo extended storage or use, without the need for recalibration.

Figure 2:
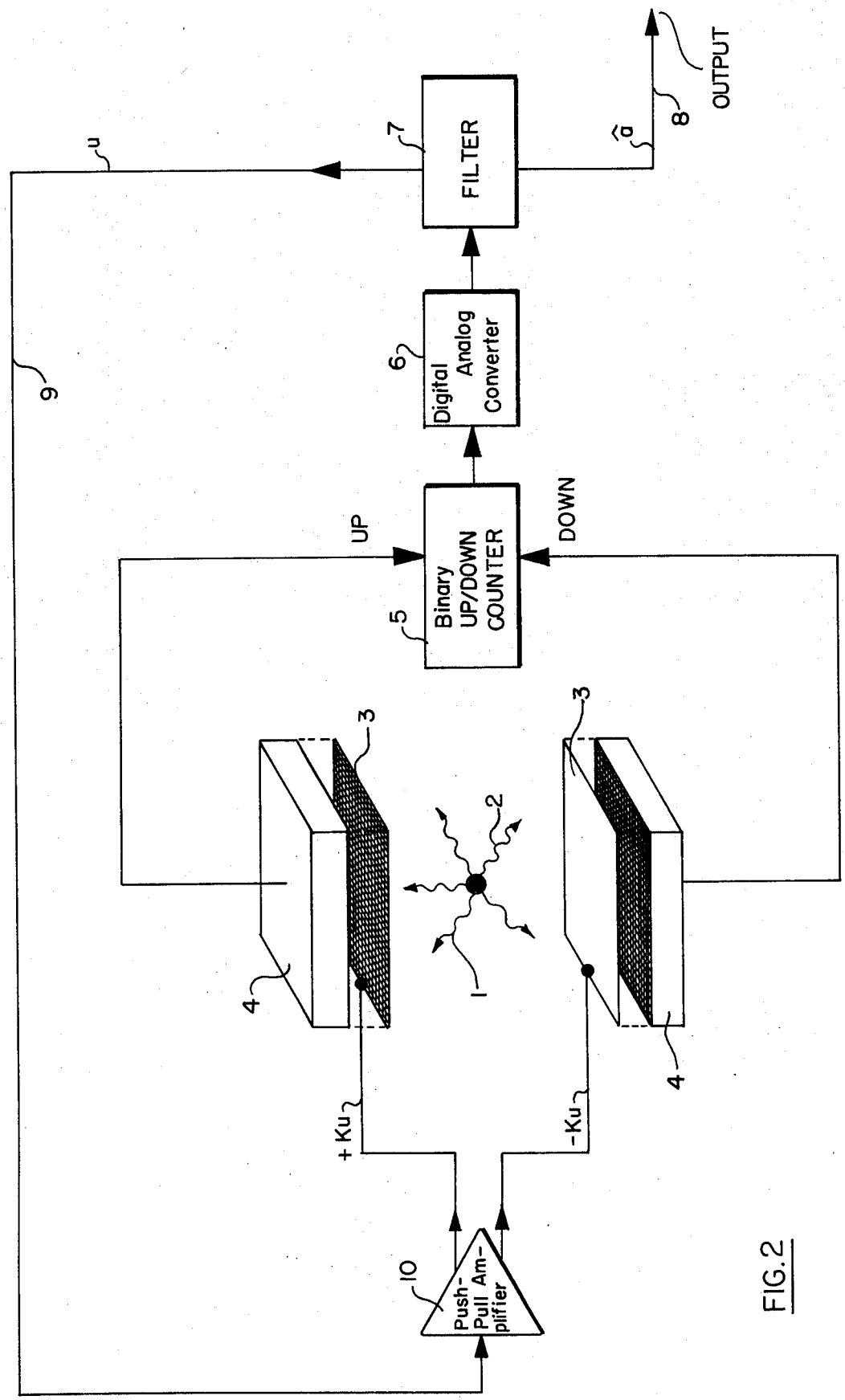
FIG. 2 is a diagram, partly schematic, and partly in block form, showing the electronic control system associated with two of the walls of the cubical cell of FIG. 1, it being understood that similar electronic systems are connected to the other two pairs of walls, so that the accelerometer may produce output signals representative of accelerations along each of the three coordinate axes.

As stated above, the diagram of FIG. 2 shows the electronic system associated with one pair of opposite walls 3 of the structure of FIG. 1, so as to provide output signals representative of accelerations along one of the three coordinate axes. A similar electronic system is connected to each of the other two pairs of walls 3 of the cubical chamber to provide outputs representative of accelerations along the other two axes. The walls 3 of the cubical chamber are composed of appropriate material to constitute electrodes for the corresponding radiation detectors 4. The radiation detectors 4 are shown as separated from the electrode walls 3 in the representation of FIG. 2, merely for purposes of clarity, since in reality each of the walls 3 is in contact with the adjacent face of the corresponding detector 4.

The electrical outputs of the detectors 4 in FIG. 2, which are positioned on the walls of one opposing pair in the structure of FIG. 1, are introduced to the input terminals of a binary up/down counter 5. It is understood in the art that each time an alpha particle or positron collides with one of the electrode walls 3, the corresponding detector 4 generates a corresponding electric pulse. The electric pulses from the upper detector 4 in FIG. 2 are applied to the binary counter 5 to cause the counter to count up, and the electric pulses from the lower detector 4 are applied to the binary counter 5 to cause the counter to count down. Therefore, the output from the binary counter 5 is the difference between the number of alpha-particles, or positrons, which have collided with the corresponding pair of opposite walls of the instrument.

The output of the binary counter 5 is converted to an analog signal in a digital/analog converter 6, the output of which is connected to a filter 7. The filter 7 provides two outputs, a first output 8 constituting an electric signal whose amplitude is a measure of the acceleration $\hat{a}$ along the particular axis; and the second output 9 constitutes a specific force command signal ($u = f/m$).

The force command signal is applied to a push/pull amplifier 10, the outputs of which are introduced to the electrodes formed by the corresponding pair of opposite walls 3, and thereby creates the forces necessary to maintain the mass 1 centered between the electrodes.

The binary up/down counter 5, the digital/analog converter 6, and the push/pull amplifier 10 are, in themselves, well known to the electronic art, and a detailed circuit description of these components is believed to be unnecessary to the full and complete understanding of the present invention. Because the radioactive charged particle 1 is small, the emission rate of alpha-particles, or positrons, from the particle also is small, and consequently the transfer functions of the filter 7 from the count input to the two outputs must be optimized. The filter 7 is constructed to provide the necessary output signals in accordance with the following technical specifications, which are set forth herein to enable one skilled in the art to construct the necessary filter.

When the instrument is not accelerating, the proof mass, having been brought to the center of the instrument, remains there. In this position the average number of sensed particle collisions on each surface wall 3 between which the proof mass is suspended will be equal. If the instrument moves, however, the proof mass will be displaced relative to the walls and the average number of collisions on each side wall 3 will be different. Assuming that the number of sensed collisions at each wall is proportional to the solid angle subtended at the proof mass by the wall, it can be shown that the difference $v$ in counting rate due to a small displacement $x$ is given by:

$$v = \frac{2\lambda}{d} x \quad (1)$$

where:
$\lambda$ = mean disintegration rate as sensed at both surfaces;
and
$d = GD$ The constant G is a geometric factor that depends on the shape of the walls, and D is the distance between the walls. For square, flat walls, $G \approx 0.59$.

In the accelerometer of the invention, as described above, the difference in the average counting rate at one wall relative to the other of each pair is used as the input signal to the control system that keeps the mass 1 centered between the walls. Because the signal consists of the effect of a number of relatively infrequent events, that is, the collisions of radioactive particles with the walls of the instrument, it is very noisy. The probability that an individual particle will strike (say) the right-hand wall of a pair when the proof mass is left of the center of the instrument is nearly as high as the probability that it will strike the left-hand wall. Accordingly, a control system that acts on the individual collisions without filtering clearly will not work. On the other hand, filtering will retard the control system response, and if the control system response is too slow, the emitting mass 1 will strike the wall of the instrument. Thus, the control system is required to provide sufficient filtering to separate the mean differential count from the noise and, at the same time, to provide a sufficiently rapid response to prevent the mass 1 from striking a wall of the instrument.

The problem can be viewed as an optimum control problem in which it is desired to minimize the expected rms position of the mass 1, the dynamics of which are given by:

$$\dot{x} = v$$
$$\dot{v} = a + u \quad (2)$$

where:
$v$ is the proof mass velocity;
$a$ is the external acceleration of the instrument;
$u$ is the internal (control) acceleration to be generated by operation of the servo system.

To solve the problem a crucial, but standard, assumption is made, namely, that the uncertainty in the counting rate can be modeled as white noise with spectral density $\lambda(\text{sec}^{-1})$. This assumption is based on the following reasoning. Suppose the proof mass is centered and the disintegrations are counted. Let $c$ be the total count. Then:

$$c = \int y \, dt \quad (3)$$

will be a random staircase function, as shown in FIG. 3.

If the intervals between disintegrations have a Poisson distribution, then the variance of the count is given by:

$$\sigma_c^2 = \lambda t \quad (4)$$

where $t$ is the time elapsed since some reference instant. The variance $\sigma_c^2$ is exactly the same as that of a Wiener process, the integral of white noise, when the white noise has the spectral density $\lambda$ (sec$^{-1}$). Thus, as far as the variance is concerned, the uncertainty in counting rate is modeled by white noise with this spectral density. Hence the observable in the process, namely the differential counting rate, when the displacement $x$ occurs may be defined as:

$$y = v + \omega$$
$$= \frac{2\lambda}{d} x + \omega \quad (5)$$

where $y$ is the observed differential counting rate, being the sum of the deterministic differential counting rate $v$ and white noise $\omega$ with the spectral density $\lambda$.

If the white noise assumption is accepted, the required control system design can be optimized by application of the "separation theorem" which asserts that the optimum control system design may be obtained by (A) constructing a Kalman filter that estimates the state of the dynamic process (2), given the observation as expressed by (5), and (B) using the estimated state as the input to a regulator designed on the basis that all state variables can be measured without error.

The overall position variance achieved by the implementation is the sum of two terms, namely:

$$\sigma_x^2 = \sigma_{xf}^2 + \sigma_{xc}^2$$

where $\sigma_{xf}$ is the rms error ($l_\sigma$) in measuring the position of the proof mass and $\sigma_{xc}$ is the additional contribution due to limitations on the control. Clearly the filtering error imposes a lower limit on the ultimate attainable rms error.

The results of Kalman filtering theory, as applied to the present problem may be summarized by the following equations.

Let $z$ be the state vector of the process. Components of this vector include the position $x$ of the proof mass, its velocity $v$ and any additional variables need to model the acceleration. That is:

$$z = \begin{bmatrix} x \\ v \\ \vdots \end{bmatrix}$$

It is assumed that, when additional variables as may be required to model the acceleration are added, $z$ satisfies a system of differential equations $$\dot{z} = Az + Bu + G\eta$$

where $u$ is the control variable, and $\eta$ is the random excitation needed in model of the external acceleration.

In accordance with the separation theorem the optimum control law that minimizes the mathematical expectation of the performance index $$V = E[z'Zz + k^2 u^2] \qquad (6)$$

is given by
$$u = -L\hat{z} \qquad (7)$$

where $\hat{z}$ is the optimum state estimate and L is the optimum control gain matrix, given by $$L = \frac{1}{k^2} B'M$$

where M is the steady-state solution to $$-\dot{M} = A'M + MA - \frac{1}{k^2} MBB'M + Z \qquad (8)$$

The weighting matrix Z in (8) is given by $$Z = \begin{bmatrix} 1 & 0 & 0 & \cdots \\ 0 & 0 & 0 & \cdots \\ \vdots & & & \\ 0 & 0 & 0 & \cdots \end{bmatrix}$$

so that:
$$z'Zz = x^2.$$

The term $k^2 u^2$ in (6) is required to avoid requiring excessive acceleration of the proof mass, not primarily because the control system would have difficulty in producing the required acceleration, but because too large an acceleration could cause the proof mass to hit the walls of the instrument in the interval between disintegrations. An estimate of a suitable value of $k^2$ is obtained by the following reasoning. Suppose that the control acceleration $u$ is constant, then $$\Delta x = \frac{1}{2} u \Delta t^2 = \frac{u}{2\lambda^2}$$

Thus the constant acceleration that produces a displacement $\Delta x$ $$u = 2 \Delta x \lambda^2$$

To prevent the proof mass from striking the wall in the interval between pulses, assuming a constant acceleration, we should make $$u < 2d\lambda^2$$

or $$\frac{u^2}{4d^2\lambda^4} < 1 \qquad (9)$$

At the same time the position error must be such that $$x^2 < d^2 \qquad (10)$$
$$\frac{x^2}{d^2} < 1$$

Assuming that the left-hand sides of (9) and (10) are to be kept approximately equal a suitable performance criterion would be:

$$V = \frac{1}{d^2} E(x^2 + \frac{u^2}{4\lambda^4}) \qquad (11)$$

Thus a suitable value of $k^2$ would be $$k^2 \approx \frac{1}{4\lambda^4} \qquad (12)$$

The optimum filter is given by $$\dot{\hat{z}} = A\hat{z} + Bu + K(y - H\hat{z}) \qquad (13)$$

where K is the Kalman gain matrix and H is the "observation sensitivity" matrix, in this case $$H = [\frac{2\lambda}{d}, 0, 0, \ldots, 0] \qquad (14)$$

and
$$K = PH'R^{-1} \qquad (15)$$

where P is the covariance matrix, i.e., $$P = E[\tilde{x}\tilde{x}']$$
and R is the observation noise spectral density matrix; in this case $$R = \lambda \qquad (16)$$

The covariance matrix is the steady-state solution to $$\dot{P} = AP + PA' - PH'R^{-1}HP + GQG' \qquad (17)$$

where $Q$ is the spectral density matrix of the process noise $\eta$.

The separation theorem allows the combination of (7) with (13) to obtain the optimum control law:

$$u = -L\hat{z} \qquad (18)$$

with $\dot{\hat{z}} = (A - BL - KH)\hat{z} + Ky \qquad (19)$

The simplest mathematical model that would permit the control system to track a constant acceleration is a random walk, i.e., $$\dot{a} = g\eta \qquad (20)$$

where $\eta$ is white noise. An initial condition $a(0) = a_0$ on (20) represents a constant acceleration which can be estimated by the Kalman filter in the control system. Consequently, the control system can track a constant acceleration. In addition, by judicious choice of the spectral density of $\eta$, excellent dynamic performance can be achieved.

To complete the design calculations (20) is combined with (2) to yield a third-order system:

$$\dot{x} = v$$
$$\dot{v} = a + u$$
$$\dot{a} = g\eta \quad (21)$$

Thus the matrices needed in (8) and (17) are given by $$A = \begin{bmatrix} 0 & 1 & 0 \\ 0 & 0 & 1 \\ 0 & 0 & 0 \end{bmatrix}, \quad B = \begin{bmatrix} 0 \\ 1 \\ 0 \end{bmatrix}, \quad G = \begin{bmatrix} 0 \\ 0 \\ g \end{bmatrix}$$

To obtain the control system gains we let $$M = \begin{bmatrix} m_1 & m_2 & m_3 \\ m_2 & m_4 & m_5 \\ m_3 & m_5 & m_6 \end{bmatrix}$$

In terms of this matrix, the matrix Riccati equation (8) becomes the following six scalar equations:

$$-\dot{m}_1 = -4\lambda^4 m_2^2 + 1 = 0$$
$$-\dot{m}_2 = m_1 - 4\lambda^4 m_2 m_4 = 0$$
$$-\dot{m}_3 = m_2 - 4\lambda^4 m_2 m_5 = 0 \quad (22)$$
$$-\dot{m}_4 = 2M_2 - 4\lambda^4 m_4^2 = 0$$
$$-\dot{m}_5 = m_3 + m_4 - 4\lambda^4 m_4 m_5 = 0$$
$$-\dot{m}_6 = 2m_5 - 4\lambda^4 m_5^2 = 0$$

The last equation has no steady state solution, since $\dot{m}_6 \neq 0$. This happens because the state $x_3 = a$ is not controllable. The term $m_6$, however does not appear in the control gain matrix $$L = -\frac{1}{k^2} B'M = -\frac{1}{k^2}[m_2, m_4, m_5]$$

The required terms of $M$ that do appear in $L$ are found from the first five equations of (22) and are $$m_2 = \frac{1}{2\lambda^2}, \quad m_4 = \frac{1}{2\lambda^3}, \quad m_5 = \frac{1}{4\lambda^4}$$

Hence the control gain matrix $$L = 4\lambda^4 \left[\frac{1}{2\lambda^2}, \frac{1}{2\lambda^3}, \frac{1}{4\lambda^4}\right] = [2\lambda^2, 2\lambda, 1] \quad (23)$$

To obtain the Kalman-filter portion of the control law we let out the covariance matrix $$P = \begin{bmatrix} p_x & p_{xv} & p_{xa} \\ p_{xv} & p_v & p_{va} \\ p_{xa} & p_{va} & p_a \end{bmatrix} \quad (24)$$

In terms of the element of this matrix the variance equation (17), in the stead-state, becomes $$2p_{xv} - \frac{4\lambda}{d^2} p_x^2 = 0$$
$$p_v + p_{xa} - \frac{4\lambda}{d^2} p_x p_{xv} = 0$$
$$p_{va} - \frac{4\lambda}{d^2} p_x p_{xa} = 0 \quad (25)$$
$$2p_{va} - \frac{4\lambda}{d^2} p_{xv}^2 = 0$$
$$p_a - \frac{4\lambda}{d^2} p_{xv} p_{xa} = 0$$
$$-\frac{4\lambda}{d^2} p_{xa}^2 + g^2 = 0$$

The solutions of these equations are:

$$p_x = \frac{g^{1/3} d^{5/3}}{4^{1/3} \lambda^{5/6}}, \quad p_{xv} = \frac{g^{2/3} d^{4/3}}{2^{1/3} \lambda^{2/3}}, \quad p_{xa} = \frac{gd}{2\lambda^{1/2}}$$

$$p_v = \frac{3gd}{2\lambda^{1/2}}, \quad p_{va} = \frac{2^{1/3} g^{4/3} d^{2/3}}{\lambda^{1/3}}$$

$$p_a = \frac{2^{2/3} g^{5/3} d^{1/3}}{\lambda^{1/6}}$$

The Kalman filter gain matrix is given by $$K = PH'R^{-1} = \frac{2}{d} \begin{bmatrix} p_x \\ p_{xv} \\ p_{xa} \end{bmatrix} \quad (26)$$

To find a suitable value for $g$, suppose that the change in acceleration in the mean interval $\Delta t = \lambda^{-1}$ between pulses is given by $$\Delta a = A$$

Then $$\overline{\Delta a^2} = A^2 = g^2 \Delta t = g\lambda^2$$

or $$g = A\lambda^{1/2} \quad (27)$$

Using this approximation for $g$, the *rms* accuracy with which the proof mass position can be measured is given by $$\sigma_x = p_x^{1/2} = \frac{1}{2^{1/3}} \frac{A^{1/6} d^{5/6}}{\lambda^{1/3}} \quad (28)$$

Also, the Kalman filter gain matrix becomes $$K = \begin{bmatrix} 2^{1/3} A^{1/3} d^{2/3} / \lambda^{2/3} \\ 2^{2/3} A^{2/3} d^{1/3} / \lambda^{1/3} \\ A \end{bmatrix} \quad (29)$$

Since the acceleration $a$ is state variable, the filter in the control systems produces an estimate $\hat{a}$. Consequently, in addition to providing the control signal, the filter also produces a filtered acceleration output.

The transfer functions of the controller from the measured differential counting rate $y$ to the two outputs $u$ and $\hat{a}$ are given by $$\frac{U(s)}{Y(s)} = -L(sI - A + BL + KH)^{-1} K$$

and $$\frac{\hat{A}(s)}{Y(s)} = [0\ 0\ 1]\ (sI - A + BL + KH)^{-1}K$$

After performing the required algebraic operations, using K and L as given by (29) and (23), respectively, it is found that $$\frac{U(s)}{Y(s)} = -\frac{(k_1l_1+k_2l_2+k_3)s^2 + (k_2l_1+k_3l_2)s + k_3l_1}{s[s^2+(k_1+l_2)s + k_1l_2+k_2+l_1]}$$

(30)

$$\frac{\hat{A}(s)}{Y(s)} = \frac{k_3(s^2+l_2s+l_1)}{s[s^2+(k_1+l_2)s+k_1l_1+k_2+l_1]}$$

where $k_i$ and $l_i$ are the elements of the gain matrices K and L.

The factor $s$ in the denominations of the transfer functions implies a pure integration, traceable to the approximation of the input acceleration as a random walk. The presence of the pure intergration facilitates the realization of the controller by permitting the use of the total differential count $c(t)$, rather than the counting rate $y(t) = \dot{c}(t)$. The transfer functions from the total differential count to the control $u$ and acceleration estimate $\hat{a}$ are the same as those in (30) without the factor s in the denominator.

The invention provides, therefore, an improved three-axis accelerometer which does not require the use of mechanical springs which limit the degree of freedom of the inertial sensing mass to one or two axes. The instrument of the present invention is also free from damping fluids which are generally used in two-axes accelerometers, and which cause problems, including those due to contamination and density variations. The accelerometer of the invention is advantageous because the potential on the inertial sensing mass is stabilized by field emissions, instead of by leakage and recombination, as was the case in the Browning instrument. Therefore, the potential of the mass of the accelerometer of the invention is stabilized, and the accelerometer may be stored or used for long intervals of time without recalibration. Also, the accelerometer of the invention uses a closed loop force feedback system, so that it is not subject to the errors of the prior art open loop systems.

It will be appreciated that while a particular embodiment of the invention has been shown and described, modifications may be made. It is intended in the following claims to cover all modifications which come within the true spirit and scope of the invention.

What is claimed is:
1. An accelerometer comprising:
   a an evacuated casing having at least two opposed parallel walls, said walls forming electrodes;
   b radioactive detectors mounted to said two parallel side walls providing outputs proportional to radiation sensed thereby;
   c a radioactive mass having a diameter of the order of 0.001 to 0.002 times the distance between said parallel side walls;
   d a up-down counter having its up input coupled to one of said radioactive detectors and its down output coupled to the other of said radioactive detectors;
   e a digital to analog convertor having its input coupled to the output of said counter for converting said output into an analog value;
   f. a filter having the transfer function:

$$\frac{U(s)}{Y(s)} = \frac{-(k_1l_1 + k_2l_2 + k_3)s^2 + (k_2l_1 + k_3l_2)s + k_3l_1}{[s^2 + (K_1 + L_2)s + k_1l_2 + k_2 + l_1]}$$

$$\frac{A(s)}{Y(s)} = \frac{k_3(s^2 + l_2s + l_1)}{[s^2 + (K_1 + l_2)s + k_1l_1 + k_2 + l_1]}$$

where $U(s)$ represents a correction output $u$ of the filter in Laplace form, $A(s)$ represents an estimate of the acceleration $a$ in the Laplace form and $Y(s)$ represents the input to the filter in Laplace form, $k_i$ and $l_i$ are the elements of the gain matrices $K$ and $L$ where $K$ equals:

$$K = \begin{bmatrix} 2^{1/3}A^{1/3}d^{2/3}/\lambda^{2/3} \\ 2^{2/3}A^{2/3}d^{1/3}/\lambda^{1/3} \\ A \end{bmatrix}$$

and L equals:

$$L = 4\lambda^4 \left[ \frac{1}{2\lambda^2}, \frac{1}{2\lambda^3}, \frac{1}{4\lambda^4} \right] = [2\lambda^2, 2\lambda, 1]$$

is the mean disintegration rate as sensed at both side walls, $A$ is the change in acceleration in the mean interval $\Delta t = \lambda^{-1}$ between pluses, and $d$ is the distance between said parallel side walls; and
   g. means coupling the correction output $u$ of said filter to said side wall electrodes to maintain said radioactive particle centered therebetween.

2. The accelerometer defined in claim 1, in which said radioactive mass emits at least one of the following: alpha-particles, beta-particles, gamma-particles and positrons.

3. The accelerometer defined in claim 1, in which said radioactive mass emits alpha-particles, or positrons so that its potential is negative and accurately defined due to field emission.

4. The accelerometer defined in claim 1, in which the chamber has a cubical shape having three perpendicularly disposed pairs of opposite side walls.

5. The accelerometer defined in claim 4 and further including additional counters, digital to analog convertors and filters associated with each of the remaining two pairs of parallel side walls.

6. The accelerometer defined in claim 1, in which said mass utilizes alpha-emitting or positron-emitting radio-nuclides so as to become negatively charged.

* * * * *